United States Patent [19]

Whisler

[11] 3,924,524
[45] Dec. 9, 1975

[54] CAB CONFIGURATION FOR STRATEGICALLY HOUSING AN ENVIRONMENTAL CONTROL UNIT ON AN ARTICULATED VEHICLE

[75] Inventor: Edwin Lee Whisler, Peosta, Iowa
[73] Assignee: Deere & Company, Moline, Ill.
[22] Filed: July 19, 1974
[21] Appl. No.: 490,139

[52] U.S. Cl. ............... 98/2.11; 180/54 A; 180/51; 98/2.05
[51] Int. Cl.² ......................................... B60H 3/00
[58] Field of Search ............. 180/54 A, 51; 98/2.11, 98/2.05–2.08

[56] References Cited
UNITED STATES PATENTS

| | | | |
|---|---|---|---|
| 3,253,671 | 5/1966 | Fielding | 180/51 |
| 3,509,810 | 5/1970 | Riester | 98/2.11 |

*Primary Examiner*—John J. Camby
*Assistant Examiner*—Henry C. Yuen

[57] ABSTRACT

An articulated vehicle includes front and rear main frame sections having cooperating parts defining a vertical pivot assembly. A boom structure is mounted on the front frame section adjacent the pivot assembly and includes a lower boom section mounted for slewing about a vertical axis. The lower boom section includes an elevated portion which is offset from the vertical axis so as to trace a path which passes generally vertically above the pivot assembly when the boom section is rotated. A cab is mounted on the rear frame section adjacent the vertical pivot assembly and includes a lower forward portion which houses an environmental control unit and projects forwardly to a location above the pivot assembly and beneath the path traced by the offset portion of the lower boom section during rotation of the latter.

1 Claim, 3 Drawing Figures

U.S. Patent Dec. 9 1975 3,924,524
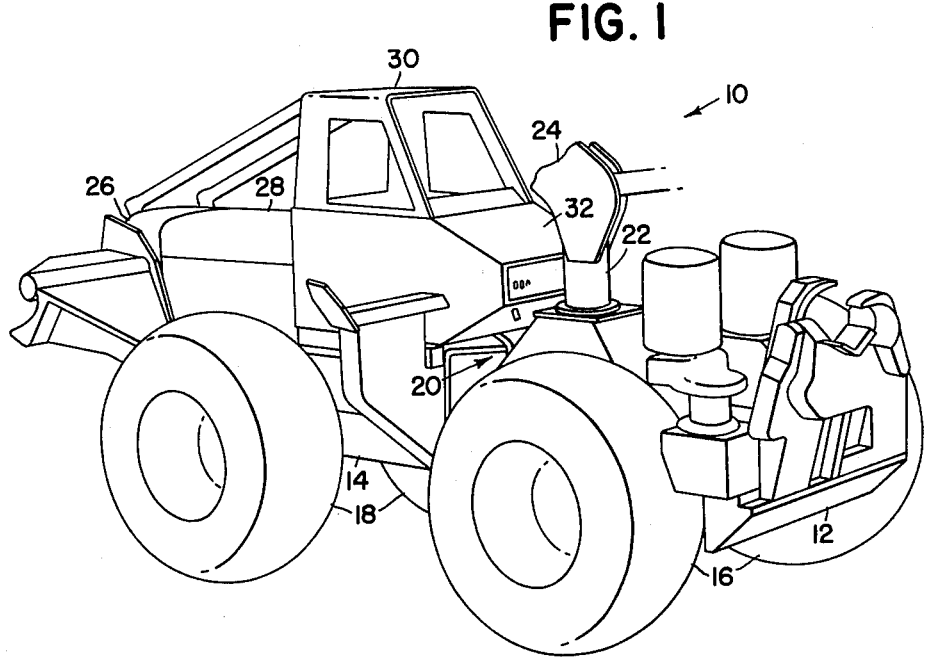
FIG. 1
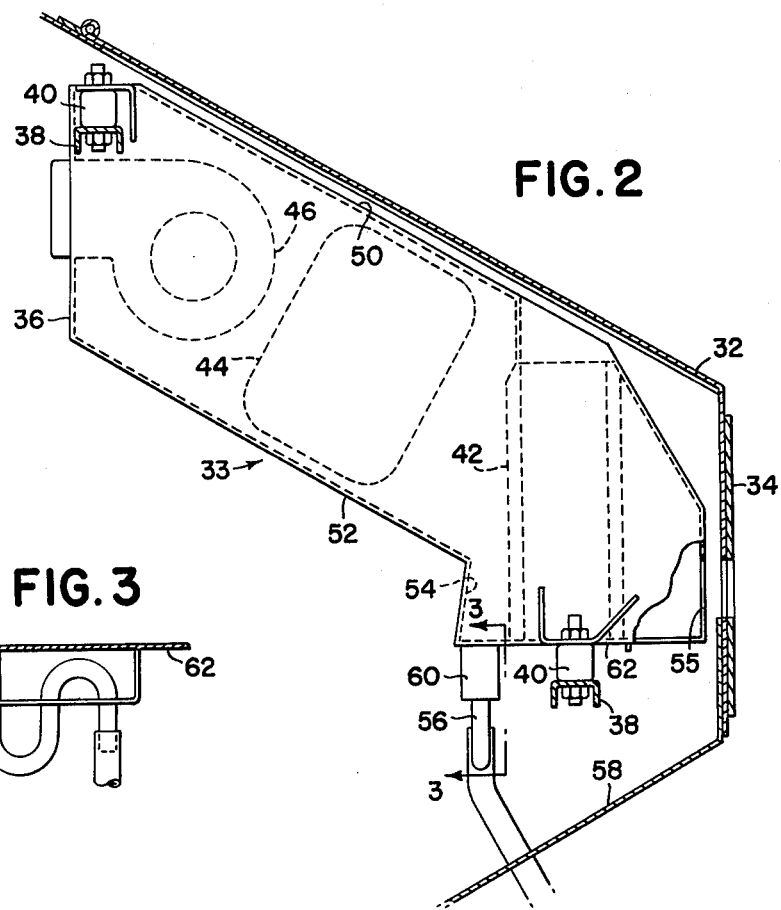
FIG. 2
FIG. 3

3,924,524

CAB CONFIGURATION FOR STRATEGICALLY HOUSING AN ENVIRONMENTAL CONTROL UNIT ON AN ARTICULATED VEHICLE

BACKGROUND OF THE INVENTION

The present invention relates to a cab and environmental control unit arrangement and more particularly relates to such an arrangement adapted particularly for use with an articulated vehicle having a cab mounted on one main frame section and a boom structure mounted on the other main frame section for slewing about a vertical axis.

Although it is common practice in the automotive industry to locate environmental control units forwardly of the operator's compartment, this practice has not been followed in the industrial or agricultural vehicle industry due to the space requirements for components of industrial and agricultural vehicles being vastly different than the space requirements for components of automotive vehicles. As a result, environmental control units of industrial and agricultural vehicles have heretofore been located on or in the roofs of these vehicles. This positioning of the environmental control units has various disadvantages. For example, it is difficult in cold weather conditions to supply sufficient heat to the lower portion of the cab to keep the operator's feet warm. Further, the various conduits necessary for conveying coolant between the unit and the engine must be routed through the framework of the cab. Also, condensate from the cooling coils of the unit may leak into the station; and dust may fall on the operator when he replaces the filters of the unit. In addition, in the case of forestry vehicles, the extra height of the vehicle cab necessary to accommodate the unit limits the clearance of the cab relative to tree branches which might be present in a forested area.

SUMMARY OF THE INVENTION

According to the present invention there is provided a novel cab configured for housing an environmental control unit in a lower forward portion thereof, the cab being especially adapted for use with an articulated industrial vehicle of a type having a cab mounted on one frame section and having a boom structure mounted on another frame section for slewing about a vertical axis.

A broad object of the invention is to provide a cab for an articulated vehicle of the type described in the paragraph immediately above, the cab configuration being such as to not necessitate an increase in the length of the vehicle to provide space for the environmental control unit.

More specifically, it is an object of the invention to provide a cab, as just described, wherein the lower forward portion projects above a vertical pivot assembly defined by the frame sections of the vehicle and is located so as to be below a horizontal path traced by an elevated offset portion of a base or lower boom section of the boom structure.

These and other objects will become apparent from a reading of the following description in conjunction with the appended drawing.

BRIEF DESCRIPTION OF THE DRAWING

FIG. 1 is a perspective view showing an industrial vehicle embodying a cab constructed according to the principles of the present invention.

FIG. 2 is a longitudinal sectional view showing the environmental control unit of the vehicle.

FIG. 3 is a sectional view taken along the line 3—3 of FIG. 2, but showing only a portion of the control unit.

DESCRIPTION OF THE PREFERRED EMBODIMENT

Referring now to the drawing, there is shown an industrial vehicle indicated in its entirety by the reference numeral 10. The vehicle 10 is an articulated type having front and rear main frame sections 12 and 14 respectively mounted on front and rear pairs of drive wheels 16 and 18 and interconnected by a vertical pivot assembly, shown generally at 20.

Mounted on the front frame section 12 adjacent the pivot assembly 20 is a boom structure including a base or lower boom section 22 mounted in a conventional manner (not shown) for slewing about a vertical axis. The boom section 22 includes an elevated portion 24 which is offset from the axis of movement of the boom section so as to trace a horizontal path which passes above the vertical pivot assembly 20. Further boom sections (not shown) would normally be supported on the base section 22 and would serve to support an implement such as a tree shear head or grapple or the like.

Supported on the rear end of the rear frame section 14 is a radiator and fan housing 26 having a hood 28 extending forwardly therefrom and defining the top of an engine compartment, as is conventional. A cab 30 is mounted on the frame section 14 between the engine compartment and the pivot assembly 20. The cab 30 includes a lower forward portion 32 which projects forwardly above the pivot assembly 20 and terminates in a louvered front wall 34.

Positioned in the forward portion 32 of the cab 30 is an environmental control unit 33 including a box-like frame or housing 36 mounted from supports 38 of the rear frame 14 through means of a plurality of resilient mounts 40 which act to isolate the unit 34 from vibrations induced in the frame section 14 during operation of the vehicle 10.

Mounted in the housing 36 of the unit 34 in serial order from front to the rear thereof are a filter, heater and evaporator coils or core and a blower fan, all being shown schematically respectively at 42, 44 and 46.

The housing 36 has upper and lower parallel walls 50 and 52 which are inclined upwardly towards the rear of the vehicle and the lower wall 52 serves to direct condensate, falling as droplets from the evaporator coils 44, to a compartment 54 arranged just forwardly and below the cooling coils so as to not interfere with the flow of air passing into the housing 36 through an opening 55 in the forward end thereof from the louvered front wall of the cab.

A pair of identical, reversely bent drain tubes 56 (only the right one is shown) have respective upper ends mounted in the bottom of the compartment 54 and respective lower ends projecting downwardly through a bottom wall 58 of the cab portion 32 which is inclined downwardly and rearwardly from the louvered front wall 34. The reverse bends of each of the drain tubes 58 is maintained by a U-shaped bracket 60 fixed to a horizontal bottom wall 62 of the housing 36, a part of the wall 62 defining the bottom of the compartment 54. The reverse bends of each of the tubes 58 serve to collect water so as to form a barrier for preventing air from being drawn thereinto due to a vacuum condition normally induced in the housing 36 due to the operation of the blower 46 and the filter 42. The walls of the tubes 58 are preferably quite thin so as to easily expand and contract when the water trapped thereby freezes and thaws during operation of the vehicle in cold weather.

The operation of the invention is thought to be obvious from the foregoing description and for the sake of brevity a discussion of the operation is omitted.

I claim:

1. In an articulated vehicle of the type including first and second frame sections pivotally interconnected by a vertical hinge structure, a boom support structure mounted on the first frame for rotation about a vertical axis located adjacent the hinge structure and including an elevated portion offset laterally from the vertical axis and located to trace an arcuate path extending directly above said hinge structure, and a cab mounted on the second frame section adjacent the hinge structure, the improvement comprising: said cab including a lower housing portion extending directly above said hinge structure at a level below said arcuate path and having at least a portion thereof located directly below a portion of said elevated portion of the boom support when the portion of the elevated portion is located directly above said hinge structure and cab environment control elements being located in said lower housing portion.

* * * * *